July 21, 1959 W. J. WILSON 2,896,177

HIGH FREQUENCY TRANSMISSION LINE TUNING DEVICE

Filed Dec. 13, 1954

William J. Wilson
*INVENTOR.*

BY Edwin M. Martin

Attorney 2,896,177
Patented July 21, 1959

2,896,177

HIGH FREQUENCY TRANSMISSION LINE TUNING DEVICE

William J. Wilson, Nashua, N.H., assignor, by mesne assignments, to Sanders Associates, Incorporated, Nashua, N.H., a corporation of Delaware Application December 13, 1954, Serial No. 474,925

10 Claims. (Cl. 333—33)

The present invention relates to high frequency electric transmission line devices. More particularly, the invention relates to tuning devices for matching the impedance of a transmission line load to its characteristic impedance.

In the prior art, particularly with coaxial transmission lines, it has been common practice to introduce a capacitive coupling device (susceptance) within the confines of the outer conductors of the line to tune out mismatches between the load impedance and the characteristic impedance of the transmission line. It would be obviously advantageous to be able to tune a transmission line in this manner exterior to its outer conductor.

It is therefor an object of the present invention to provide an improved high frequency electric transmission line tuning device whereby a load impedance may be matched to the characteristic impedance of the line from outside of the outer conductors of the line.

Other and further objects and advantages achieved by the invention will be apparent from the following description of preferred embodiments thereof, taken in connection with the accompanying drawings.

In accordance with the present invention there is provided a composite high frequency electric transmission line tuning device which comprises a pair of elongated outer conductors and an elongated inner conductor. Insulating means position the inner conductor in spaced relation to the outer conductors. A slot is provided in one of the outer conductors. A variable capacitive means is disposed on the outside of this outer conductor adjacent the slot. This outer conductor is thereby capacitively coupled to the inner conductor through the slot, whereby a load impedance may be matched to the characteristic impedance of the line by adjustment of at least the degree the capacitive means extends over the slot to adjust the impedance of the line to the load impedance.

In one embodiment of the invention there is provided a composite high frequency electric transmission line tuning device which comprises a pair of elongated outer conductors and an elongated inner conductor. Insulating means position the inner conductor in spaced relation to the outer conductors. The elongated slot in one of the outer conductors extends in the longitudinal direction thereof at least a half wave length at the lowest operating frequency of the line and is narrower than the inner conductor. An elongated movable conductor is in contact with and disposed on the outside of the one outer conductor adjacent the slot, perpendicular thereto and in a plane parallel thereto. The one outer conductor is thereby capacitively coupled to the inner conductor through the slot, whereby a load impedance may be matched to the characteristic impedance of the line by adjustment of at least the degree the movable conductor extends over the slot to adjust the impedance of the line to the load impedance.

Figure 1:
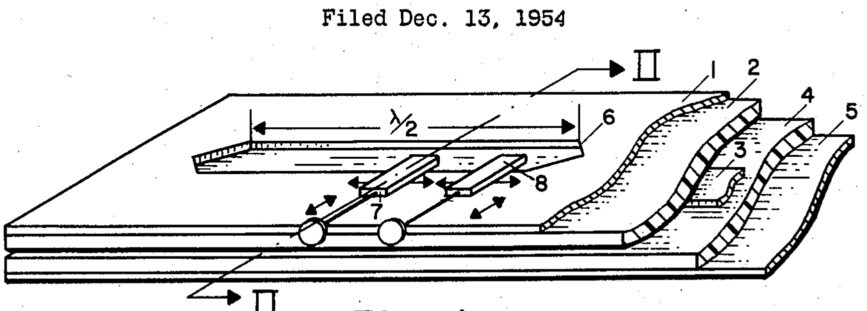
Fig. 1 is a three-dimensional, fragmentary and partially schematic view of an embodiment of the present invention.
Figure 2:
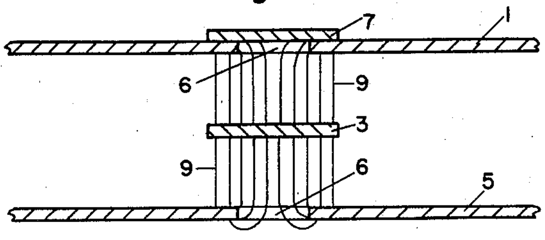
Fig. 2 is a schematic cross-sectional view, taken along the line II—II of Fig. 1, illustrating the operation of the invention.
Figures 3, 4, 5:
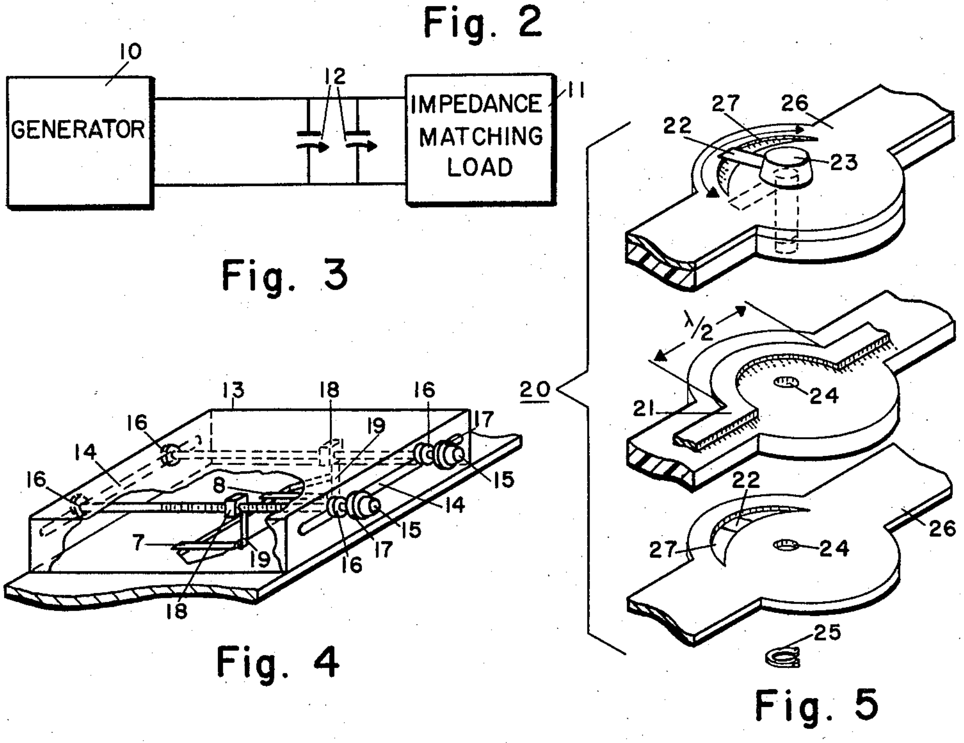
Fig. 3 is a schematic diagram further illustrating the operation of the invention.
Fig. 4 is a three-dimensional view illustrating a particular aspect of the invention.
Fig. 5 is a three-dimensional, exploded view of a modification of the invention.

Referring now to the drawings and with particular reference to Figs. 1, 2 and 3, there is shown a composite high frequency electric transmission tuning device which comprises a pair of elongated outer conductors 1 and 5 and an elongated inner conductor 3 (preferably formed from 1 mil copper). Insulating means as represented by the members 2 and 4 (formed, for example, from XXXP-phenolic resin) position the inner conductor 3 in spaced relation to the outer conductors 1 and 5. The components are bound together with a suitable adhesive such as a phenolic butyral. A slot 6 is formed in the outer conductor 1. Variable capacitive means comprising elongated movable conductor elements 7 and 8 are disposed on the outside of the conductor 1 adjacent and transverse of the slot 6, as shown. The cross-sectional view of Fig. 2 illustrates the distribution of the electric fields 9 in a case where slots are formed in both of the outer conductors 1 and 5. In the region surrounding the slot a difference in potential between the inner conductor 3 and the outside surface of the outer conductor 5 is indicated.

In Fig. 3 a transmission line is schematically shown connected between a generator 10 and a load 11 characterized by an impedance Z. Variable capacitors 12 symbolize the capacity obtained between the movable conductors 7 and 8 and the inner conductor 3.

In Fig. 4 a mechanical device is illustrated which is adapted to move the conductors 7 and 8. A housing 13 has slots 14 formed therein at its opposite ends as shown. Knobbed-screws 15 are positioned in the slots 14 by bearings 16. The bearings 16 may be assembled to the housing 13 by welding or soldering. Nuts 17 may be tightened to secure the knobbed-screws 15 in fixed positions. Movable threaded members 18 are connected through a spring contact 19 to the members 7 and 8. The housing 13 is suitably secured to the outer conductor 1 as for example with solder.

In Fig. 5 there is illustrated a modification of the invention wherein a similar transmission line indicated generally at 20 has its inner conductor 21 formed in a suitable curved pattern as shown. In outer conductors 26 curved slots 27 are formed as shown, to permit tuning with the movable conductors 22. A knobbed member 23 is mechanically connected to the movable conductors 22 through apertures 24 as shown. The opposite end of the knobbed member 23 is connected to the member 22 with a suitable clip 25.

The operation of the invention will first be discussed with particular reference to Figs. 1 to 4. A slot in the outer conductors of a transmission line of the type described distorts the electric field in a manner as illustrated below the inner conductor 3 in Fig. 2. Flux lines from the inner conductor 3 to the outer surface of the outer conductor 5 appear to form a fringing field. The positioning of a conductor 7 across the slot increases the effective shunt capacity at that point. Both longitudinal and transverse motion of movable conductors 7 and 8 are necessary, effectively to transform the apparent impedance of the load to equal the characteristic impedance of the transmission line. As is well known in the art, when the load impedance is not equal to the characteristic impedance, so-called standing waves appear along the length of the transmission line. The apparent reactance at any given point on the line is a function of the standing wave ratio or the amount of mismatch involved. The slot is chosen to be at least a half of a wave length long at the lowest operating frequency to permit the insertion of a shunt capacity at those points which appear inductive. Since the character of the reactance changes with every quarter-wave length, a half-wave length slot is sufficient to insure positive tuning.

In this regard a form of staggered tuning is possible where a plurality of slots in series are employed with a plurality of movable conductors, whereby successive adjustments are made possible.

It will be seen that adjusting the transverse position of the movable conductors determines the amount of capacity introduced between the outer conductor 1 and the inner conductor 3. Adjustment of the position of the movable conductors longitudinally along the transmission line enables the line to be terminated in its characteristic impedance. In the embodiment chosen the two movable conductors 7 and 8 are substantially mutually independent. The use of two such conductors extends the range of mismatch which can be corrected. As will be apparent to those skilled in the art, the transmission line of the present invention propagates energy of the TEM mode; the fields between the inner and outer conductors being balanced. The use of tuning conductors on one side of the line only, tends to introduce a certain unbalance which is easily corrected by forming opposite slots on each of the outer conductors and tuning both sides simultaneously.

In the embodiment of Fig. 4 rotation of the knobs 15 causes the conductors 7 and 8 to move transversely. The conductors 7 and 8 may be positioned longitudinally along the line by holding and moving both knobs 15 and bearings 16 longitudinally.

In the embodiment of Fig. 5 no transverse adjustment of the position of the movable conductors 22 is available to vary the amount of capacity introduced. The conductors 22 are ganged together and controlled by the knob 23. Rotation of the knob 23 enables the line to be tuned to its characteristic impedance by what is essentially a longitudinal adjustment in position.

The slots are tapered in accordance with conventional practice to minimize discontinuities in the line.

In an actual embodiment of the present invention which was constructed and tested, the outer conductors 1 and 5 were chosen of copper to be .774 inch wide and .001 inch thick. The inner conductor 3 was chosen to be .096 inch wide and .001 inch thick. The insulators 2 and 4 were chosen to be .064 inch thick. The individual components were assembled together with a phenolic butyral. The slot was chosen to be .094 inch wide and 1.5 inches long to provide for an operating frequency range of 3 to 5 kilo-megacycles. The transmission line thus formed has a characteristic impedance of 50 ohms. The movable conductors 7 and 8 were chosen to be .250 inch long by .100 inch wide.

The present invention greatly enhances the flexibility of high frequency transmission lines in that tuning adjustments of the type described are now readily accomplished.

While there has been hereinbefore described what is at present considered preferred embodiments of the invention, it will be apparent that many and various changes and modifications may be made with respect to the embodiments illustrated, without departing from the spirit of the invention. It will be understood, therefore, that all such changes and modifications as fall fairly within the scope of the present invention, as defined in the appended claims, are to be considered as a part of the present invention.

What is claimed is:

1. A composite high frequency electric transmission line tuning device comprising a pair of elongated outer conductors; an elongated inner conductor; insulating means holding said inner conductor in spaced relation to said outer conductors; a slot in one of said outer conductors; a movable conductor disposed on the outside of said one outer conductor adjacent said slot and in electrical and mechanical contact with said one outer conductor for capactively coupling said one outer conductor and said inner conductor through said slot; and means for adjusting at least the degree said capacitive means extends over said slot to adjust the impedance of said line, whereby a load impedance may be matched to the characteristic impedance of said line by adjustment of the position of said capacitive means.

2. A composite high frequency electric transmission line tuning device comprising a pair of elongated outer conductors; an elongated inner conductor; insulating means holding said inner conductor in spaced relation to said outer conductors; an elongated slot in one of said outer conductors extending in the longitudinal direction thereof less than one-half wave length at the lowest operating frequency of said line and being narrower than said inner conductor; a movable conductor disposed on the outside of said one outer conductor adjacent said slot and in electrical and mechanical contact with said one outer conductor for capacitively coupling said one outer conductor and said inner conductor through said slot; and means for adjusting at least the degree said capacitive means extends over said slot to adjust the impedance of said line, whereby a load impedance may be matched to the characteristic impedance of said line by adjustment of the position of said capacitive means.

3. A composite high frequency electric transmission line tuning device comprising a pair of elongated outer conductors; an elongated inner conductor; insulating means holding said inner conductor in spaced relation to said outer conductors; a slot in one of said outer conductors; an elongated movable conductor disposed on the outside of said one outer conductor adjacent said slot perpendicular thereto and in a plane parallel thereto, said movable conductor in electrical and mechanical contact with said one outer conductor for capacitively coupling said one outer conductor and said inner conductor through said slot; and means for adjusting at least the degree said capacitive means extends over said slot to adjust the impedance of said line, whereby a load impedance may be matched to the characteristic impedance of said line by adjustment of the position of said movable conductor.

4. A composite high frequency electric transmission line tuning device comprising a pair of elongated outer conductors; an elongated inner conductor; insulating means holding said inner conductor in spaced relation to said outer conductors; a plurality of opposing slots in said outer conductors; a plurality of movable conductors disposed outside said outer conductors adjacent said slots, capacitively coupling said outer and inner conductors through said slots; and means for adjusting at least the degree said capacitive means extends over said slots to adjust the impedance of said line, whereby a load impedance may be matched to the characteristic impedance of said line by adjustment of the positions of said movable conductors.

5. A composite high frequency electric transmission line tuning device comprising a pair of elongated outer conductors; an elongated inner conductor; insulating means holding said inner conductor in spaced relation to said outer conductors; a pair of opposing tapered slots in said outer conductors; a plurality of movable conductors disposed on the outside of said outer conductors adjacent said slots, capacitively coupling said outer and said inner conductors through said slots; and means for adjusting the positions of said movable conductors along the length of said slots to vary the impedance of said line whereby a load impedance may be matched to the characteristic impedance of said line by correlated adjustments of the positions of said movable conductors.

6. A composite high frequency electric transmission line tuning device, comprising: a pair of elongated outer conductors each including an elongated slot, said slots being congruently disposed opposite each other; an elongated inner conductor at least partially electrically exposed by said slots; insulating means holding said inner conductor in spaced relation between said outer conductors; a plurality of movable conductors individually disposed on the exterior surfaces of said outer conductors adjacent said slots for capacitively coupling said outer and said inner conductors through said slots in a balanced manner; and means for adjusting the position of said movable conductors along the length of said slots to vary the impedance of said line, whereby a load impedance may be matched to the characteristic impedance of said line by correlated adjustments of the positions of said movable conductors.

7. A composite high frequency electric transmission line tuning device, comprising: a pair of elongated outer conductors each including an elongated, axially disposed slot tapered at both axial ends, said slots being congruently disposed opposite each other; an elongated inner conductor wider than said slots and at least partially electrically exposed by said slots; insulating means holding said inner conductor in spaced relation between said outer conductors; a plurality of movable conductors individually disposed on the exterior surfaces of said outer conductors adjacent said slots for capacitively coupling said outer and said inner conductors through said slots in a balanced manner; and means for adjusting the position of said movable conductors along the length of said slots to vary the impedance of said line, whereby a load impedance may be matched to the characteristic impedance of said line by correlated adjustments of the positions of said movable conductors.

8. A composite high frequency electric transmission line tuning device, comprising: a pair of wide, thin elongated outer conductors each having a section of enlarged width and each having a curved slot in said sections; a thin, narrower elongated inner conductor having a curved section; insulating means holding said inner conductor in spaced relation between said outer conductors with said curved section between said curved slots; a plurality of movable conductors individually disposed on the exterior surfaces of said outer conductors adjacent said slots for capacitively coupling said outer and said inner conductors through said slots in a balanced manner; and means for rotating said movable conductors along the length of said slots to vary the impedance of said line, whereby a load impedance may be matched to the characteristic impedance of said line by correlated rotation of said movable conductors.

9. A composite high frequency electric transmission line tuning device, comprising: a pair of wide, thin elongated outer conductors each having a substantially circular section each having a substantially semi-circular slots in said sections; a thin, narrower elongated inner conductor having a substantially semi-circular section; insulating means holding said inner conductor in spaced relation between said outer conductors with said semicircular section between said semi-circular slots; a plurality of movable conductors individually disposed on the exterior surfaces of said outer conductors adjacent said slots for capacitively coupling said outer and said inner conductors through said slots in a balanced manner; and means for rotating said movable conductors along the length of said slots to vary the impedance of said line, whereby a load impedance may be matched to the characteristic impedance of said line by correlated rotation of said movable conductors.

10. A composite high frequency electric transmission line tuning device, comprising: a pair of wide, thin elongated outer conductors each having a section of enlarged width and each having a curved slot in said sections; a thin, narrower elongated inner conductor having a curved section; insulating means holding said inner conductor in spaced relation between said outer conductors with said curved section between said curved slots; a plurality of movable conductors individually disposed on the exterior surfaces of said outer conductors adjacent said slots for capacitively coupling said outer and said inner conductors through said slots in a balanced manner; and a shaft through said wide section of said outer conductors and affixed to said movable conductors for rotating said movable conductors along the length of said slots to vary the impedance of said line, whereby a load impedance may be matched to the characteristic impedance of said line by correlated rotation of said movable conductors.

References Cited in the file of this patent

UNITED STATES PATENTS

| | | |
|---|---|---|
| 2,404,797 | Hansen | July 30, 1946 |
| 2,436,427 | Ginzton | Feb. 24, 1948 |
| 2,757,344 | Kostriza | July 31, 1956 |